US006285886B1

United States Patent
Kamel et al.

(12)

(10) Patent No.: US 6,285,886 B1
(45) Date of Patent: Sep. 4, 2001

(54) METHOD FOR CONTROLLING POWER FOR A COMMUNICATIONS SYSTEM HAVING MULTIPLE TRAFFIC CHANNELS PER SUBSCRIBER

(75) Inventors: Raafat Edward Kamel, Westfield; Wen-Yi Kuo, Parsippany; Martin Howard Meyers, Montclair; Carl Francis Weaver, Hanover Township; Xiao Cheng Wu, Parsippany, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/349,238

(22) Filed: Jul. 8, 1999

(51) Int. Cl.[7] ...................................................... H04B 7/00
(52) U.S. Cl. .............................................. 455/522; 455/69
(58) Field of Search ............................... 455/522, 63, 69, 455/67.1, 67.3, 70; 370/332, 333, 334, 335, 336, 337

(56) References Cited

U.S. PATENT DOCUMENTS

| 5,485,486 | * | 1/1996 | Gilhousen et al. | 455/522 |
| 5,574,979 | * | 11/1996 | West | 455/63 |
| 5,678,187 | * | 10/1997 | Meidan et al. | 455/63 |
| 5,806,003 | * | 9/1998 | Jolma et al. | 455/522 |

OTHER PUBLICATIONS

Telecommunication Industry Association (TIA) /Electronics Industry Assocuation (EIA), International Standard (IS)–2000.2 Section 2.1.3.1.11.3.

* cited by examiner

Primary Examiner—Nay Maung
Assistant Examiner—Quochien B. Vuong (57) ABSTRACT

A power control method of the invention may be applied to downlink power control, uplink power control, or both to support different quality of service levels for multiple channels per a mobile station. The power control method transmits control data between a base station and a multi-channel mobile station on a single communications channel or sub-channel to minimize or reduce overhead traffic from the control data.

40 Claims, 4 Drawing Sheets

METHOD FOR CONTROLLING POWER FOR A COMMUNICATIONS SYSTEM HAVING MULTIPLE TRAFFIC CHANNELS PER SUBSCRIBER

FIELD OF THE INVENTION

This invention relates to wireless communication systems and more particularly to a method for controlling power for a communications system having multiple traffic channels per subscriber.

BACKGROUND

Wireless communication systems may use power control schemes to reduce interference among mobile subscribers or to increase subscriber traffic capacity. Adequate power control is particularly important for proper performance of a subscriber's mobile station in a code-division multiple-access environment. The evolution of wireless communication systems is contemplated in which a single mobile station may operate over multiple channels simultaneously. Therefore, a need exists for a power control scheme which is sufficiently adaptable to handle single-channel or multiple-channel communications per each mobile station in a wireless communications network.

SUMMARY OF THE INVENTION

In accordance with the invention, the power control method may be applied to downlink power control, uplink power control, or both to support different quality of service levels for multiple traffic channels per each subscriber. In the context of downlink power control, a wireless communications system establishes a first communications channel and a second communications channel for contemporaneous operation between a mobile station and a base station. The mobile station recognizes a first quality of service target for the first communications channel and a second quality of service target for the second communications channel. A mobile station measures a first quality of service parameter and a second quality of service parameter. The mobile station transmits control data over the first communications channel, the second communications channel, or a control channel to control downlink transmit power of the base station. The control data includes incremental update data based upon the first quality of service parameter and the first quality of service target for the first communications channel. The control data may contain incremental offset data based upon a second quality of service parameter and a second quality of service target. The incremental offset data is defined with reference to the incremental update data. Advantageously, the incremental offset data may be transmitted efficiently over a single channel between the mobile station and the base station on an as-needed basis to reduce overhead control traffic.

In the context of uplink power control, the base station measures the first quality of service parameter and the second quality of service parameter. The base station transmits control data over the first communications channel, the second communications channel, or a control channel to control uplink transmit power of the mobile station. Accordingly, the power control roles of the base station and the mobile station are interchanged for uplink versus downlink power control. The method for controlling power is well-suited for conserving system resources by reducing, or otherwise minimizing, the volume of control data transmitted between the base station and a multi-channel mobile station.

DETAILED DESCRIPTION OF THE PREFERRED EMBODIMENT

Figure 1:
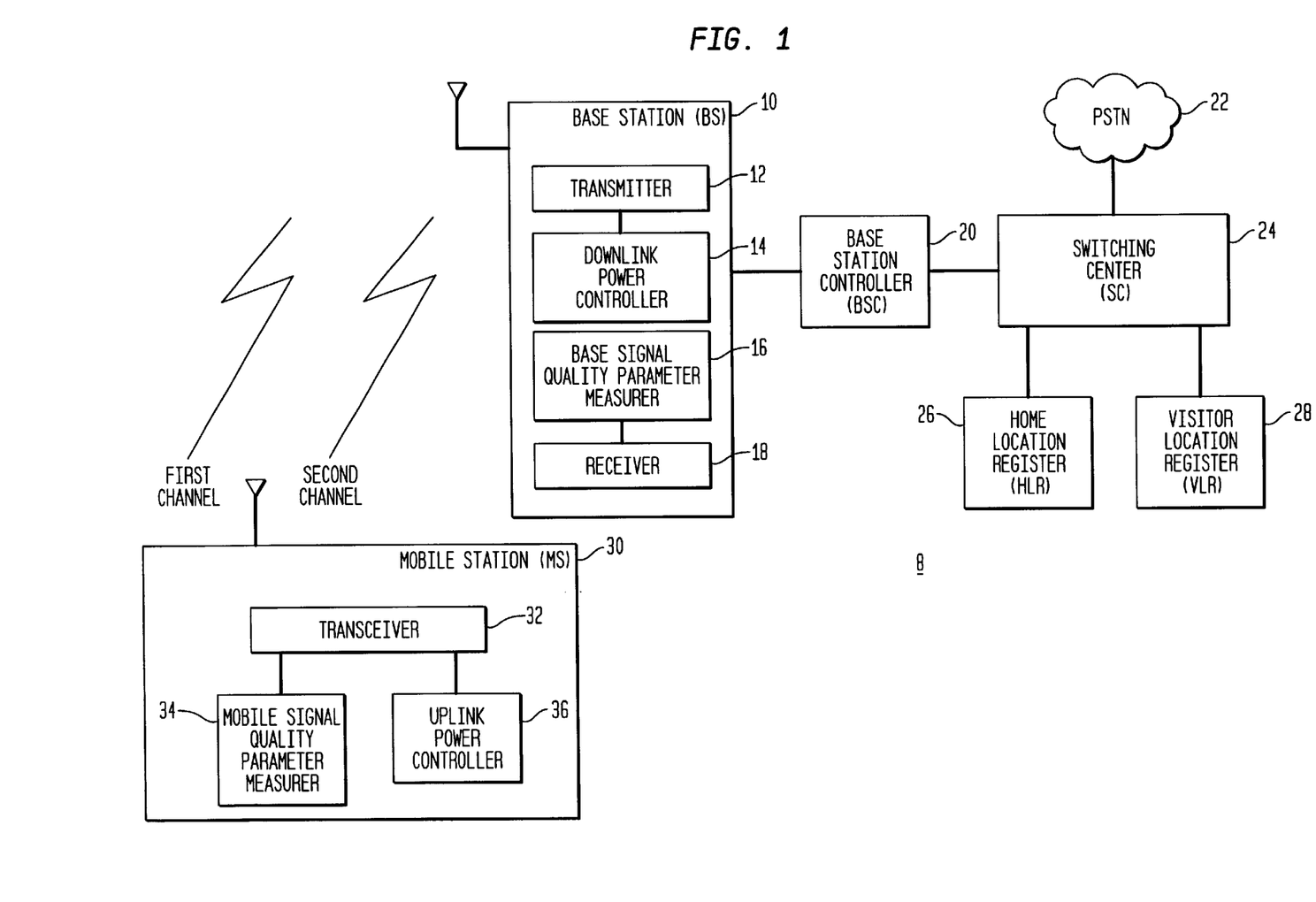
FIG. 1 illustrates a block diagram of a wireless communications system in accordance with the invention.

In accordance with the invention, FIG. 1 shows a wireless communication system 8 including a base station 10 coupled to a base station controller 20, a switching center 24 coupled to the base station controller 20, and a home location register 26 and a visitor location register 28 coupled to the switching center 24. The switching center 24, the base station controller 20, or both may be interconnected to a local public switched telephone network(PSTN) 22 to provide a mobile station 30 with access to telephone service.

The base station controller 20 includes a data processing system that controls and manages communications between the base station 10 and the mobile station 30. For instance, the base station controller 20 may assign one or more communications channels to the base station 10 in response to a mobile call, a landline call, or both.

The base station 10 includes a receiver 18 coupled to a base measurer 16, although in an alternate embodiment the receiver 18 may include an integral signal quality parameter measurer. The base measurer 16 is arranged to measure signal quality parameters on one or more communication channels transmitted from the mobile station 30. For example, such signal parameters may include an error rate (e.g., frame error rate (FER)), a signal-to-noise ratio (e.g., Eb/No), both, or another suitable indication of transmission/reception quality.

The downlink power controller 14 is capable of independently controlling the downlink transmit power of a transmitter 12 for multiple communications channels. For example, the downlink power controller 14 can adjust a first communications channel and a second communications channel to have different downlink transmit powers, or identical downlink transmit powers.

The mobile station 30 has multiple-channel capability for simultaneous communication between the base station 10 and the mobile station 30 over at least a first communications channel and a second communications channel. The mobile station 30 includes a transceiver 32 coupled to a mobile measurer 34 and an uplink power controller 36. The transceiver 32 is sufficiently wide-band to accommodate at least two simultaneous channels in any receive mode, any transmit mode, or any full-duplex mode of one or more channels.

The mobile measurer 34 is arranged to measure signal quality parameters of one or more communication channels transmitted from the base station 10. The uplink power controller 36 is capable of independently controlling the uplink transmit power of the transceiver 32 for multiple communication channels.

Figure 2:
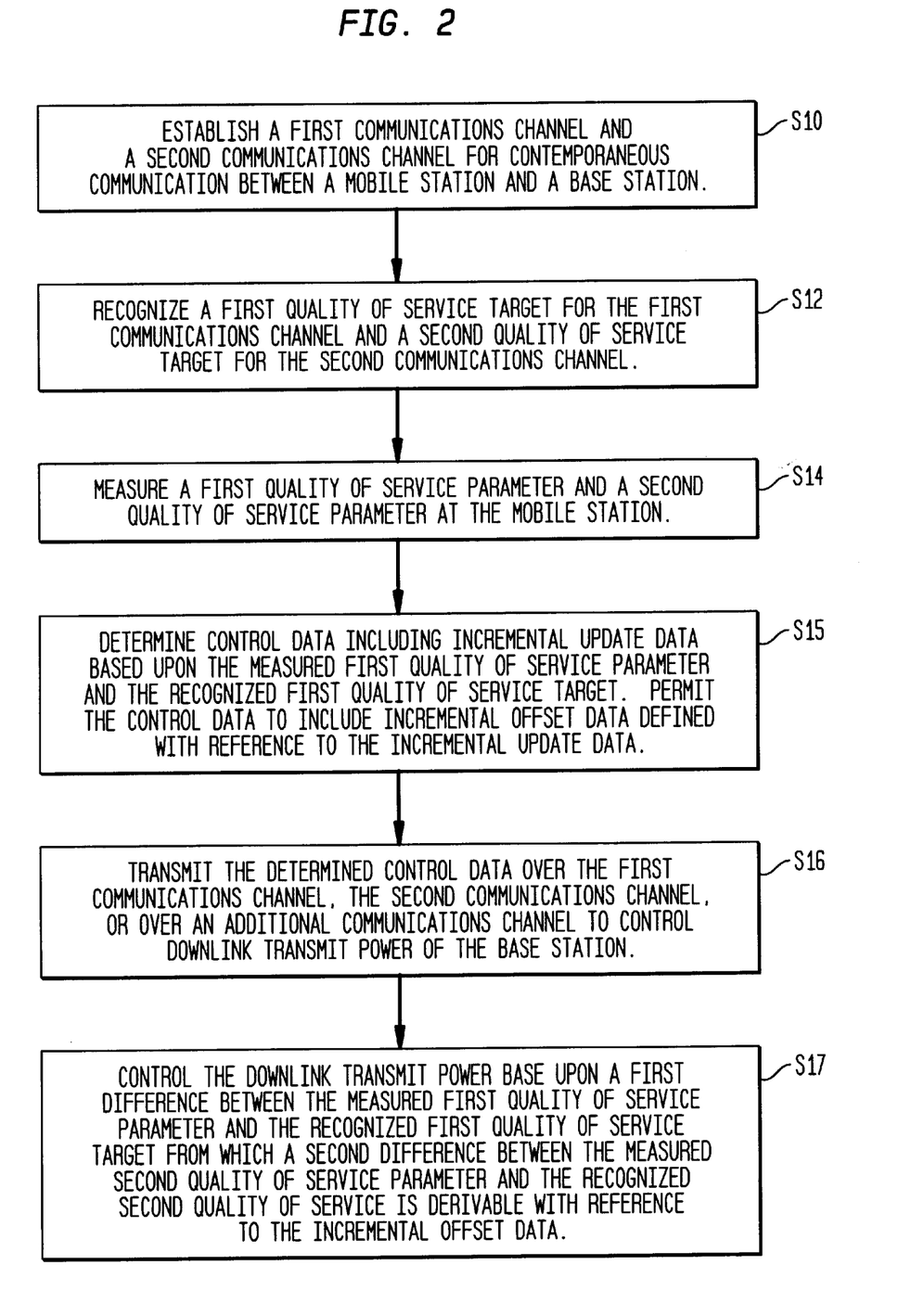
FIG. 2 is a flow chart of a method for controlling downlink power for multiple traffic channels per subscriber in accordance with the invention.

In accordance with the invention, the method of controlling power may be applied to downlink power control, uplink power control, or both to support different quality of service levels for multiple traffic channels between one or more mobile stations 30 and a base station 10. FIG. 2 illustrates a method of controlling downlink power starting in step S10. In step S10, a wireless communications system 8 establishes a first communications channel and a second communications channel for contemporaneous operation between a mobile station 30 and a base station 10. As used herein, contemporaneous operation means that the first communications channel and the second communications channel operate simultaneously or during a common time period, in which a first duration of the first communication channel temporally overlaps with a second duration of a second communications channel. The beginning of the first duration and the start of the second duration may occur at different times, just as the end of the first duration and the end of the second duration may occur at different times.

Although the first and second communication channels may be any type of communications channel, in one illustrative example, the first communications channel comprises a voice channel and the second communications channel comprises a data channel to permit a subscriber to conduct a voice call and a data call simultaneously with identical or different reliability levels.

In step S12, a mobile station 30 recognizes a first quality of service target for the first communications channel and a second quality of service target for the second communications channel. The first and second quality of service targets are selected to conform to desired reliability levels. Desired reliability levels may result from empirical measurements of radio frequency coverage within a geographic region, mathematical models, statistical models, or any combination of the foregoing techniques. Traffic loading statistics or dynamically available traffic capacity may influence the quality of service targets.

The base station 10, the mobile station 30, or the wireless communications system 8 may set a first quality of service target for the first communications channel and a second quality of service target for the second communications channel. In a first example where the base station 10 or the base station controller 30 sets the quality of service targets, the base station 10 may provide the mobile station 30 with a first quality of service target and a second quality of service target in a transmission (e.g., access response).

In a second example where the wireless system 8 sets the quality of service targets, the base station controller 20 or base station 10 generally has authorization to supersede a subscriber's desired or requested quality of service. The subscriber's desired or requested quality of service may be indicated by a subscriber-definable target value. Upon reception of the quality of service targets from the base station 20, the mobile station 30 recognizes the quality of service targets as valid and applicable.

In a third example where the mobile station 30 sets the quality of service targets, the mobile station 30 may recognize its own default target values or a subscriber-definable target value for the first quality of service target and the second quality of service target. The default target values can be used if the base station 10 does not transmit the first quality of service target and the second quality of service target to the mobile station 30. The default target value or subscriber-definable value allows reliable execution of the method in the face of radio frequency coverage problems (e.g., fading or multipath) or where different air-interface data protocols need to supported transparently. Further, the wireless communications system 8 may support the mobile station's ability to dynamically request a specific quality of service target corresponding to a particular type of channel (e.g., data or voice).

In the first, second or third example, the first and second quality of service targets are associated with a corresponding mobile station identifier in a database. The database is accessible by the base station controller 30 or the base station 10. For example, a home location register 26 (HLR) and the visitor location register 28 (VLR) contain databases for storing a first and second quality of service target. The VLR, the HLR, or both contain subscriber data and features of one or more mobile stations 30.

In one embodiment, the first quality of service target preferably comprises an error rate (e.g., a bit-error rate (BER)), a frame-error rate (FER), or another suitable indication of the degree of reliability of the first communications channel. The second quality of service target preferably comprises an error rate, a frame-error rate (FER), or another suitable indication of the degree of reliability of the second communications channel. A particular error rate, or range, is associated with a corresponding level of quality of service for a communications channel. Each time a mobile station 30 sets up or participates in a call, the communication channels that support the call are assigned corresponding target qualities of service.

The actual values of the first quality of service target and the second quality of service target may be based on the type of traffic the first communications channel and the second communications channel are handling at any particular time. For example, the first quality of service target may differ from the second quality of target, if the first communications channel carries voice traffic and if the second communications channel carries data traffic at any particular time. Accordingly, voice traffic may have a first quality of service target as an frame-error rate (FER) of one percent, whereas the data traffic may have a second quality of service target as an FER of five percent. Even if the first communications channel and the second communications channel carry the same general type of traffic (e.g., they both carry data traffic), the subscriber may desire different quality grades of data traffic (or voice traffic) on the first communications channel and the second communications channel.

In an alternate embodiment, the first quality of service target and the second quality of service target comprise a signal-to-noise level, a signal-to-interference level, a signal strength measurement, or another suitable indication of transmission or reception quality over a communications channel. One of ordinary skill in the art will appreciate that error rates are related to signal-to-noise in accordance with the electromagnetic propagational environment of the wireless system in any particular coverage area.

In step S14, a mobile station 30 measures a first quality of service parameter and a second quality of service parameter. The measured first quality of service parameter preferably corresponds in kind to the recognized first quality of service target to permit comparison of the measured first quality of service parameter with the recognized first quality of service target. Similarly, the measured second quality of service parameter preferably corresponds in kind to the recognized second quality of service target to permit comparison of the measured second quality of service parameter with the recognized second quality of service target.

The mobile station 30 includes a mobile measurer 34 for measuring the first quality of service parameter over a first communications channel and the second quality of service parameter over a second communications channel. The same mobile signal quality measurer 34 may be used to measure both the first communications channel and the second communications channel if downlink reception measurements are made in a time-division multiplex manner or in accordance with a temporally alternate time schedule. The mobile station 30 measures the first and the second quality of service parameters, such as downlink power and frame-error rate (FER), to return useful control data in an uplink transmission to the base station 10.

After step S14 in step S15, the mobile station 30 determines control data to transmit to the base station 10 for power control of the downlink transmit power. The control data contains incremental update data based upon the measured first quality of service parameter and the recognized first quality of service target. The control data may contain offset incremental data defined with reference to the incremental update data. The incremental offset data maybe used to derive a second difference between the measured second quality of service parameter and the second quality of service target with reference to the incremental update data.

In one example, the incremental update data and the offset data convey a first and second incremental change in electromagnetic transmit power of the base station 10. The first incremental change refers to a desired change in electromagnetic (e.g., radio frequency) transmit power of the base station 10 for the first communications channel. Similarly, the second incremental change refers to a desired change in electromagnetic transmit power of the base station 10 for the second communications channel. The first incremental change (of the first communication channel) and a second incremental change (of the second communication channel) preferably represent adjustments of the downlink transmit power to achieve or maintain the first quality of service target and the second quality of service target, respectively. The first incremental change in the downlink transmit power and the second incremental change in the downlink transmit power may represent an adjustment, an increase, or a decrease in decibels to the transmit power of the transmitter 12 of the base station 10. The base station controller 20 or the base station 10 responds to adjust the downlink transmit power of one or more channels of a particular base station 10 in response to the control data such that the downlink transmit power provides a quality of service level consistent with the target quality of service.

The first incremental change is commensurate with (e.g., proportional to)the first difference between the measured first quality of service parameter and the recognized first quality of service target. The second incremental change is commensurate with (e.g., proportional to) the second difference between the measured second quality of service parameter and the recognized second quality of service target.

In step S16, the mobile station 30 transmits the control data over the first communications channel, the second communications channel, or an additional channel (e.g., control channel) to control downlink transmit power of the base station 10. For example, the mobile station 30 may transmit the first incremental change in the electromagnetic power of the base station 10 as incremental update data and a second incremental change in the electromagnetic power as incremental offset data defined with reference to the incremental update data. The first incremental change in electromagnetic transmit power and the second incremental change in electromagnetic transmit power are commensurate with the first difference and the second difference, respectively. In practice, the first incremental change and the second incremental change may represent discrete levels of increase or decrease in radio frequency transmit power that are supported by the base station 10.

Although any first incremental change in downlink transmit power of the first communications channel and any second incremental change in downlink transmit power of the second communications channel could be transmitted independently within the control data, a second incremental change in power of the second communications channel is preferably represented by incremental offset data. The incremental offset data is referenced to the first incremental change in power to reduce the amount of control data transmitted between the mobile station 30 and the base station 10. The incremental update data is used for both the first communications channel and at least one additional communications channel (e.g., the second communications channel) with the incremental offset data representing the incremental change or steady state of one or more additional communications channels.

The mobile station 30 does not need to transmit the ultimate required signal-to-noise ratio to the base station 10, because all that is needed is information on an incremental increase, decrease, or adequacy of the transmit power to achieve the desired signal-to-noise ratio for the target. Significantly, the control data for multiple channels of the same mobile station 30 are transmitted from the mobile station 30 to the base station 10 over a single common channel or sub-channel to conserve system resources or increase system capacity.

In one embodiment, the single common channel or sub-channel is carved out of the first communications channel or the second communications channel. The first incremental change and the second incremental change are, in effect, transmitted over the common channel in a manner consistent with conserving system capacity or enhancing the signal-to-noise ratio of the wireless system. Accordingly, the common channel may comprise a sub-channel or data channel carved out of the first communications channel or the second communications channel by bit robbing, bit borrowing, packet alterations, or the like.

However, in an alternate embodiment, the power control data may be transmitted over an additional communications channel as the common communications channel. The additional communications channel is distinct from the first communications channel and the second communications channel. Thus, the additional communications channel may comprise an access channel, a grant channel, a control channel, an overhead channel, or another suitable data channel of a wireless communications system for radio frequency communication between a mobile station 30 and a base station 10.

In step S17, the downlink power controller 14 receives the control data from the mobile station 30 and adjusts downlink transmit power of one or more communication channels accordingly. To properly control the downlink transmit power, the base station 10 or the downlink power controller 14 may derive a second incremental change or a second difference between the measured second quality of service parameter and the second quality of service target by referring to the incremental offset data.

Following step S17, subsequent incremental changes in the downlink transmit power of the first communications channel and the second communications channel are updated by transmission over the common communications channel between the mobile station 30 and the base station 10. Subsequent incremental changes in the downlink transmit power update previous incremental changes based on more recent downlink reception measurements of the mobile signal parameter measurer 34 on a regular basis or on an as-needed basis.

In the scheme of a regular updating procedure, the incremental update data associated with the first channel is updated more frequently than the incremental offset data. The incremental offset data allows adjustment of a difference between the first incremental change and the second incremental change. The frequency of regular or periodic updating is consistent with adequately controlling the power of multiple traffic channels per subscriber. For application to a wireless system supporting the IS-2000 standard, for example, the update frequency of the incremental update data is preferably higher than the update frequency of the incremental offset data by a factor of more than sixteen.

Although the incremental offset data and the incremental update data could be updated at regular intervals, or otherwise, to support a wireless system, the incremental offset data is preferably updated on an as-needed basis to further reduce overhead control data transmitted over the air interface. As a result, the mobile station 30 may transmit a lesser volume of control data to the base station 10 to control the downlink transmit power, without detrimentally affecting the attainment of the target qualities of service for multiple traffic channels per subscriber. The incremental offset data may be updated on an as-needed basis to reduce the amount of control data transmitted between the mobile station 30 and the base station 10. Therefore, the method for controlling power is well-suited for conserving channel bandwidth and reducing signal-to-noise interference in a wireless communications system.

Figure 3:
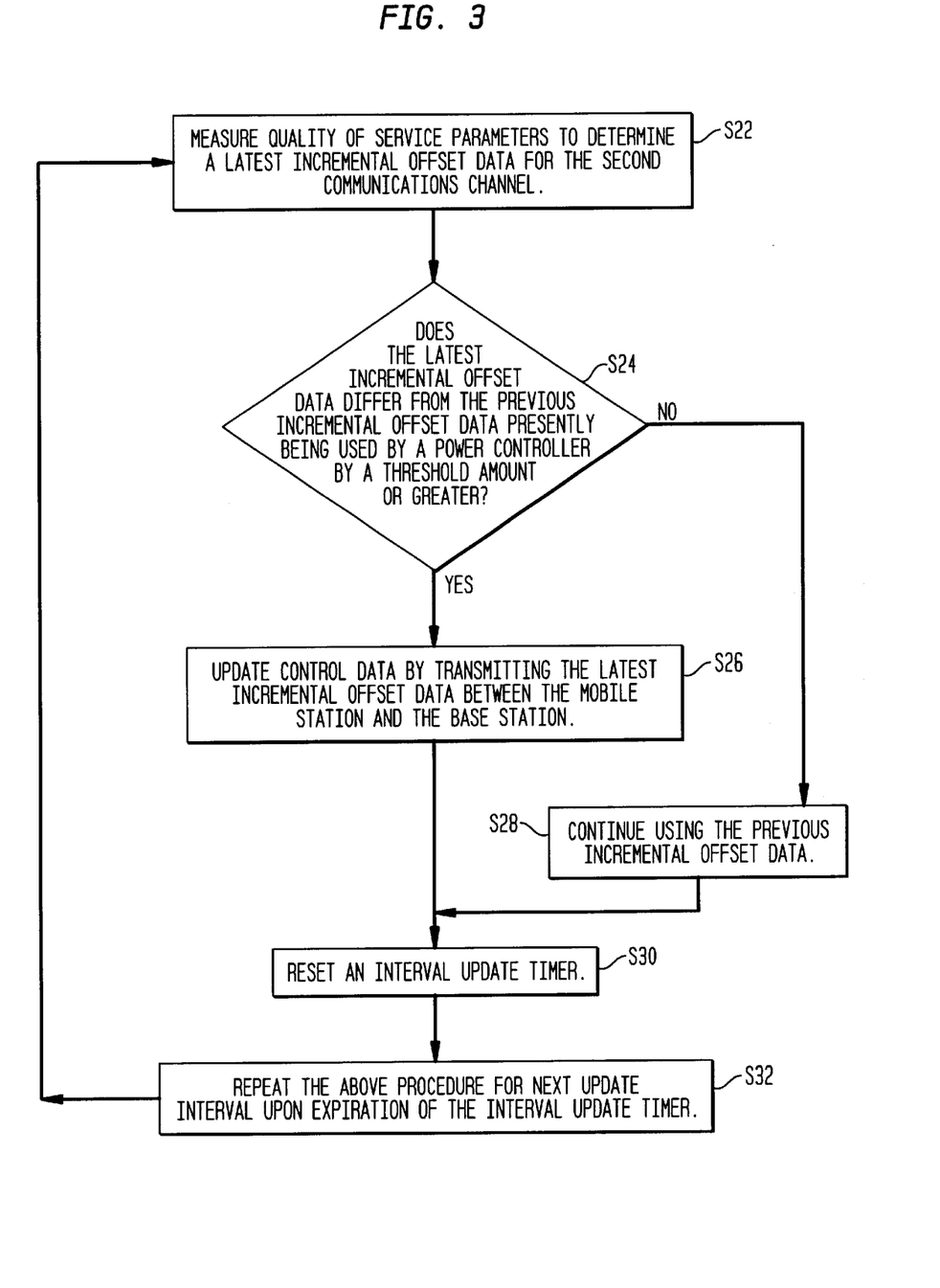
FIG. 3 is a flow chart illustrating an as-needed updating procedure for updating incremental offset data on power control.

FIG. 3 shows an illustrative procedure for transmitting incremental offset data between the mobile station and the base station on an as-needed basis. The update procedure of FIG. 3 starts in step S22 following step S16 of FIG. 2. In step S22, mobile station 30 measures the quality of service parameters to determine a latest incremental offset data for the second communications channel.

In step S24, if an error differential exceeds a predetermined threshold, which may be expressed in decibels (e.g., 2 dB), then an update is needed and carried out in step S26. The error differential represents a mathematical difference between the previous offset value in use at the base station 10 (e.g., via the downlink power controller 14) and the latest offset value determined from measurement at the mobile station 30. The update of the control data requires the transmitting of the latest incremental offset data between the mobile station 30 and the base station 10.

If the update is not needed as determined in step S24, the update procedure proceeds with step S28 in which the downlink power controller 14 continues using the previous incremental offset data. The previous offset value presently in use is used as a constant (or as an interim value until updated) to derive the second incremental changes from the most recent first incremental changes. The first incremental changes are used to adjust the power of the first channel. The first incremental changes are continuously, regularly, or periodically updated regardless of whether revisions or the latest incremental offset data is transmitted to the base station 10 at the same time.

Following step S26 or step S28, the update procedure continues with step S30 in which an interval update timer is reset in the mobile station 30. In step S32, upon expiration of the interval update timer set in step S30, the above procedure is repeated by returning first to step S22.

During each update interval, the mobile station 30 updates the first incremental data and may update the offset incremental data, if needed. The mobile station 30 may transmit control data, the offset incremental data, or both as a layer three message to the base station 10.

Figure 4:
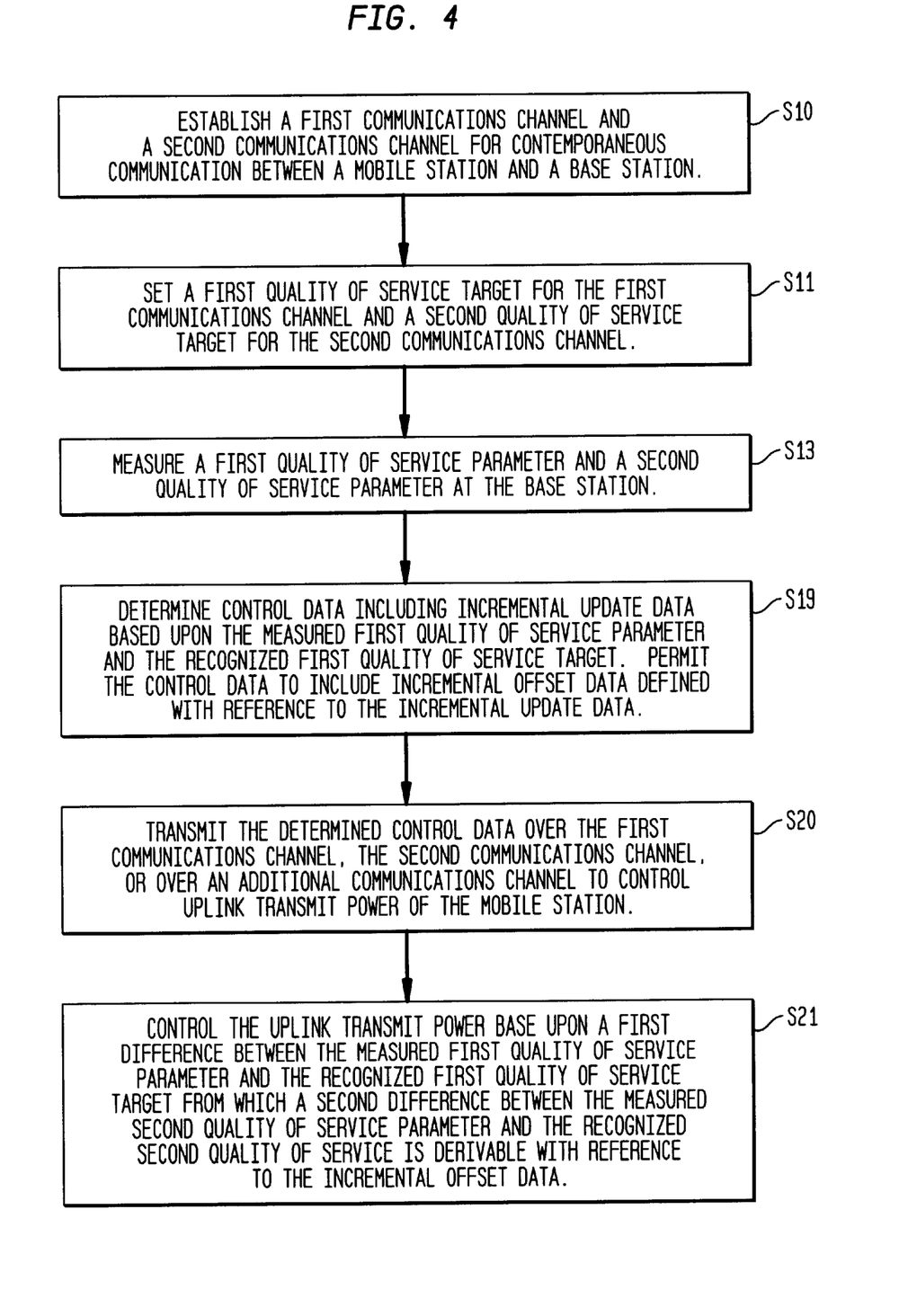
FIG. 4 is a flow chart of a method for controlling uplink power for multiple traffic channels per subscriber in accordance with the invention.

The method of FIG. 4 is similar to the method of FIG. 2 except that FIG. 4 covers the context of uplink power control. Between FIG. 2 and FIG. 4, the power control roles of the base station and the mobile station are interchanged, as the context requires, to accommodate downlink transmit power control or uplink transmit power control. Accordingly, all of the variations, alternate embodiments, and details discussed in conjunction with the downlink illustration of FIG. 2 apply with equal force to the uplink illustration of FIG. 4.

Starting in step S10 of FIG. 4, a wireless communications system 8 establishes a first communications channel and a second communications channel between a mobile station 30 and a base station 10 for simultaneous or temporally overlapping operation. Step S10 of FIG. 4 is identical to step S10 of FIG. 2.

In step S11, the wireless communications system 8 sets a first quality of service target for the first communications channel and a second quality of service target for the second communications channel in a similar manner as described in conjunction with step S12 of FIG. 2. However, here in FIG. 4 the first quality of service target and the second quality of service target refer to uplink power control, whereas the first quality of service target and the second quality of service target in FIG. 2 refer to downlink power control. If both downlink and uplink power control are used simultaneously for a subscriber on two communications channels, at least four possible quality of service targets are required for the subscriber to practice the method of the invention.

In step S13, the base station 10 measures a first quality of service parameter and a second quality of service parameter at the base station 10. The base station 10 includes a base measurer 16 for measuring the first quality of service parameter over a first communications channel and the second quality of service parameter over a second communications channel. The same base measurer 16 may be used to measure both the first communications channel and the second communications channel if measurements are made in a time-division multiplex manner or in accordance with a temporally alternate time schedule. The base station 10 measures the first and the second quality of service parameters, such as uplink power and frame-error rate (FER), to return useful control data in an downlink transmission to the mobile station 30.

After step S13 in step S19, the base station 10 or the base station controller 20 determines control data to transmit to the mobile station 30 for power control of the uplink transmit power. The control data contains incremental update data based upon the measured first quality of service parameter and the recognized first quality of service target. The control data may contain offset incremental data defined with reference to the incremental update data. The incremental offset data maybe used to derive the second difference between the measured second quality of service parameter and the second quality of service target with reference to the incremental update data.

In one example, the incremental update data and the offset data convey a first and second incremental change in electromagnetic transmit power of the mobile station 30. The first incremental change refers to a desired change in electromagnetic transmit power of the mobile station 30 for the first communications channel. Similarly, the second incremental change refers to a desired change in electromagnetic transmit power of the mobile station 30 for the second communications channel. The first incremental change (of the first communication channel) and a second incremental change (of the second communication channel) preferably represent adjustments of the uplink transmit power to achieve or maintain the first quality of service target and the second quality of service target, respectively. The first incremental change in the uplink transmit power and the second incremental change in the uplink transmit power may represent an adjustment, an increase, or a decrease in decibels to the transmit power of the transceiver 32 of the mobile station 30.

The first incremental change is commensurate with the first difference between the measured first quality of service parameter and the recognized first quality of service target. The second incremental change is commensurate with the second difference between the measured second quality of service parameter and the recognized second quality of service target.

In step S20, the base station 10 transmits the determined control data over the first communications channel or the second communications channel to control uplink transmit power of the mobile station 30.

In step S21, the uplink power controller 36 receives the control data from the base station 10 and adjusts uplink transmit power of one or more communication channels accordingly. To properly control the uplink transmit power, the uplink power controller 36 may derive a second incremental change or a second difference between the measured second quality of service parameter and the second quality of service target by referring to the incremental offset data. The uplink power controller 36 responds to adjust the uplink transmit power of one or more channels of a particular mobile station 30 in response to the control data such that the uplink transmit power provides a quality of service level consistent with the recognized quality of service targets.

Following step S21, the control data may be updated regularly, on an as-needed basis, or otherwise. Although FIG. 3 applied to downlink power control, an analogous update procedure may be applied to uplink power control where the roles of the base station 10 and the mobile station 30 are reversed. Accordingly, the base measurer 16 in the base station 10 would facilitate updating of control data at the mobile station 30 on an as-needed basis for control of the uplink transmit power via the uplink power controller 36.

In accordance with the invention, a mobile station 30 may conduct a voice call and a data call simultaneously. The voice call has a voice quality of service target, whereas the data call has a data quality of service target. The voice quality of service may be distinct from the data quality of service. For example, the data target may be less robust than the voice target because the data traffic is readily repeated in response to errors.

The foregoing methods of FIG. 2, FIG. 4, or both may be applied to a code-division multiple access (CDMA) system that features a data packet service. Such a CDMA system may have two channels assigned to one forward link between a mobile station 30 and a base station 10. For example, a first channel may provide a 9.6 Kbps control channel (CCH) or a combined voice and control channel (FCH) at 9.6 Kbps, while the second channel may comprise a supplemental channel (SCH) that provides a low-duty cycle, high-rate burst channel for packets. The control channel (CCH) is required to maintain a call and must operate continuously and as reliably as one would expect for a voice call. In addition, downlink power control, uplink power control, or both are needed to operate continuously on the control channel (CCH) to provide suitable tracking of signal fading and compensation for fading to maximize traffic capacity.

If a supplemental data channel (SCH) burst is transmitted and if the Eb/No requirements are identical to a SCH and a CCH channel, the power consumption of the SCH ordinarily would be greater by an amount proportional to the ratio of SCH rate to the CCH rate. (Eb represents the received energy per bit and Io or No is the noise density received at each mobile station's demodulator.) However, in practice, the average Eb/No requirements may vary depending on the actual fast fading propagational environment of a particular coverage area and target quality of service (e.g., FER). Accordingly, the power control method of the invention may be used to provide a time-variant offset to the downlink transmitter 12 and the uplink transceiver 32 to compensate for such fading. The update frequency of the incremental update data allows the power level first communications channel to be updated sufficiently quickly to allow compensation for such fading. However, the lower update frequency (or rate) of the offset incremental data may not permit the same degree of compensation for fading as the incremental update data does. While the offset incremental data could be transmitted on a one-to-one basis with a reference incremental data set, the offset incremental data is preferably only transmitted with an incremental data set when it changes by a significant amount. Accordingly, by minimizing the transmission of the control data, transmit power and system capacity may be conserved.

In an alternate embodiment, the base station transmitter 12 may store and use an initial average value of the Eb/No offset without transmitting any further updates for the duration of a call. Although not updating the offset further reduces the power consumption of the mobile station 30 and reduces traffic, the ideal offset value may vary with the propagational environment (e.g., fading); hence, there may be some capacity sacrificed by using an initial average value, rather than a continuously updated one, or at least one that is updated on an as-needed basis.

In accordance with the above invention, the outer-loop and inner-loop power control is enhanced to control the power of multiple channels for a signal subscriber with different quality of service for each active channel. The inner-loop and outer-loop uplink power control in the CDMA environment generally operates in the following manner to support the method of the invention.

In accordance with the inner-loop power control, a base station 10 receiver 18 measures average Eb/Io received from a mobile station 30. A base station 10 transmits commands over the forward link to the mobile station 30 to adjust the mobile's transmitted power. For example, if the Eb/Io was higher than a reference Eb/Io than the mobile's transmitted power is reduced by an increment. On the other hand, if the Eb/Io is lower than a reference Eb/Io, than the mobile's transmitted power is increased by an increment. The Eb/Io reference may depend upon the multipath environment and the desired error performance, among other factors, for appropriate inner-loop power control.

In addition to the above inner-loop power control in which a base station 10 measures the Eb/Io of a mobile station 30, the base station 10 may measure a mobile stations 30 error rate to adjust the reference Eb/Io in accordance with an outer-loop control scheme. Outer-loop power control refers to the measuring of error rate and adjustment of the reference Eb/Io. The outer-loop can change the initial inner-loop target to a revised inner-loop target based on a measurement of a frame-error rate, for example. Accordingly, the transmit power of the mobile station 30 is adjusted to maintain a given error rate per each voice frame or message packet. In practice, the error rate is often arranged to provide less than 1% severely errored or errored seconds per call. Although the inner-loop and outer-loop power control are described with reference to uplink power control, similar outer-loop and inner-loop power control schemes may be applied to the downlink power control.

The above inner-loop and outer-loop power control mechanisms are used to control the power levels of the first communications channel in a CDMA wireless system. The second channel, however, has additional power control instructions cooperating with or embedded into the inner loop and outer loop mechanism such that the incremental update data and the incremental offset data are separated by a fixed constant of transmit power until updated during a successive updating interval.

As used herein, first incremental data refers to incremental update data for the first communications channel, whereas second incremental data refers to incremental update data for the second communications channel. The second incremental data is readily derived with reference to the first incremental data and the incremental offset data. The incremental offset data is preferably updated on an as-needed basis. Although incremental offset data and any other control data may be embedded into the first communications channel or the second communications channel, in an alternate embodiment the wireless system establishes a third channel between the mobile station 30 and the base station 10 for transmission of control data.

In one version the method for controlling power in the wireless system monitors quality metrics such as frame-error rate (FER) and super-frame error rate (SER) of the CCH and the SCH. The frame-error rate of the CCH and SCH are translated into corresponding Eb/No values for ready comparison to a signal quality target expressed as a signal-to-noise or signal-to-interference ratio. Accordingly, the first signal quality target and the second signal quality target are expressed as a CCH Eb/No setpoint and a SCH Eb/No setpoint, respectively. Given an initial value for CCH Eb/No setpoint and SCH Eb/No setpoint, the wireless system will increment the Eb/No setpoint up or down depending upon the quality metrics for both channels. The SCH Eb/No setpoint (or the CCH Eb/No setpoint) will be used as a target for the inner-loop power control, while the Eb/No difference between the SCH and the CCH Eb/No setpoint will be sent to the transmit end of the link and used to change the difference between CCH and SCH transmit Eb/No at the transmitter (e.g., 12) of the base station. The required update interval is expected to be in order of seconds or longer so that a Layer 3 message could be used to update the Eb/No difference determined at the mobile station.

A layer 3 message includes application-program data in which power control data typically resides to control a electromagnetic power in a wireless communications system. The Layer 3 message interacts with a Layer 2 message for managing a data link protocol, and a Layer 1, which represents the physical layer.

In sum, the method of controlling power allows multiple channels per mobile station to have different quality of service levels. Power control information for a multi-channel mobile station is sent over a single communications channel or sub-channel between the mobile station and the base station to maximize the available traffic capacity of the wireless communications system or otherwise improve signal to interference performance. Further, certain control information is sent on an as-need basis to reduce the overhead control traffic that would otherwise be associated with servicing a multi-channel mobile station with different quality of service levels.

This specification describes various embodiments of the method of the present invention. The scope of the claims is intended to cover various modifications and equivalent arrangements of the illustrative embodiments disclosed in the specification. Therefore, the following claims should be accorded the reasonable broadest interpretation to cover the modifications, equivalent structures, and features which are consistent with the spirit and scope of the invention disclosed herein.

The following is claimed:

1. A method for controlling power in a wireless communications system that supports multiple communication channels per mobile station, the method comprising the steps of:
   recognizing a first quality of service target for a first communications channel and a second quality of service target for a second communications channel;
   measuring a first quality of service parameter and a second quality of service parameter at a mobile station;
   transmitting control data over at least one of said first communications channel and said second communications channel to control downlink transmit power based upon the first quality of service parameter and the first quality of service target and incremental offset data for the second communications channel.

2. The method according to claim 1 wherein transmitting control data further comprises transmitting a first difference between the first quality of service and the first quality of service target.

3. The method according to claim 1 further comprising the step of deriving a second difference between the second quality of service parameter and the second quality of service target with reference to the incremental offset data.

4. The method according to claim 1 wherein the transmitting step includes sending the incremental offset data on an as-needed basis.

5. The method according to claim 1 further comprising the step of updating the control data by sending a latest incremental offset data between the mobile station and the base station to supersede said incremental offset data in said transmitting step.

6. The method according to claim 1 further comprising the step of updating the control data by sending a latest incremental offset data between the mobile station and the base station to supersede said transmitted incremental offset data in said transmitting step, if the latest incremental offset data differs from said previous incremental offset data by a threshold amount or greater.

7. The method according to claim 1 wherein the transmitting step includes sending incremental update data related to the first difference and the incremental offset data related to a second difference between the second quality of service parameter and the second quality of service target.

8. The method according to claim 1 further comprising the step of establishing a voice channel as the first channel and a data channel as the second channel for temporally overlapping or simultaneous operation.

9. The method according to claim 1 wherein the setting step includes a first error rate as the first quality of service and a second error rate as the second quality of service, wherein the first error rate and the second error rate have different values.

10. The method according to claim 1 wherein the setting step includes a first frame-error rate as the first quality of service and a second frame-error rate as the second quality of service, wherein the frame-error rate and the second frame-error rate have different values.

11. A method for controlling power in a wireless communications system that supports multiple communication channels per subscriber, the method comprising the steps of:
   recognizing a first quality of service target for a first communications channel and a second quality of service target for a second communications channel;
   measuring a first quality of service parameter and a second quality of service parameter at a mobile station;
   transmitting control data over a single control channel to control downlink transmit power based upon the first quality of service parameter and the first quality of service target and incremental offset data for the second communications channel.

12. The method according to claim 11 wherein transmitting control data further comprises transmitting a first difference between the first quality of service and the first quality of service target.

13. The method according to claim 11 further comprising the step of deriving a second difference between the second quality of service parameter and the second quality of service target with reference to the incremental offset data.

14. The method according to claim 11 wherein the transmitting of control data includes sending the incremental offset data on an as-needed basis.

15. The method according to claim 11 further comprising the step of updating the control data by sending a latest incremental offset data between the mobile station and the base station to supersede said incremental offset data in said transmitting step.

16. The method according to claim 11 further comprising the step of updating the control data by sending a latest incremental offset data between the mobile station and the base station to supersede said transmitted incremental offset data in said transmitting step, if the latest incremental offset data differs from said previous incremental offset data by a threshold amount or greater.

17. The method according to claim 11 wherein the transmitting of control data includes sending incremental update data related to the first difference and the incremental offset data related to a second difference between the second quality of service parameter and the second quality of service target.

18. The method according to claim 11 further comprising the step of establishing a first channel as a voice channel and a second channel as a data channel for temporally overlapping or simultaneous operation.

19. The method according to claim 11 wherein the setting step includes a first error rate as the first quality of service and a second error rate as the second quality of service, wherein the first error rate and the second error rate have different values.

20. The method according to claim 11 wherein the setting step includes a first frame-error rate as the first quality of service and a second frame-error rate as the second quality of service, wherein the frame-error rate and the second frame-error rate have different values.

21. A method for controlling power in a wireless communications system that supports multiple communication channels per subscriber, the method comprising the steps of:
   setting a first quality of service target for the first communications channel and a second quality of service target for the second communications channel;
   measuring a first quality of service parameter and a second quality of service parameter at a base station;
   transmitting control data over one of said first communications channel and said second communications channel to control uplink transmit power based upon a first difference between the first quality of service parameter and the first quality of service target and incremental offset data.

22. The method according to claim 21 wherein transmitting control data further comprises transmitting a first difference between the first quality of service and the first quality of service target.

23. The method according to claim 21 further comprising the step of deriving a second difference between a second quality of service parameter and a second quality of service target with reference to the incremental offset data.

24. The method according to claim 21 wherein the transmitting of control data includes sending the incremental offset data on an as-needed basis.

25. The method according to claim 21 further comprising the step of updating the control data by sending a latest incremental offset data between the mobile station and the base station to supersede said incremental offset data in said transmitting step.

26. The method according to claim 21 further comprising the step of updating the control data by sending a latest incremental offset data between the mobile station and the base station to supersede said transmitted incremental offset data in said transmitting step, if the latest incremental offset data differs from said previous incremental offset data by a threshold amount or greater.

27. The method according to claim 21 wherein the transmitting of control data includes sending incremental update data related to the first difference and the incremental offset data related to a second difference between the second quality of service parameter and the second quality of service target.

28. The method according to claim 21 further comprising the step of establishing a voice channel as the first channel and a data channel as the second channel for temporally overlapping or simultaneous operation.

29. The method according to claim 21 wherein the setting step includes a first error rate as the first quality of service and a second error rate as the second quality of service, wherein the first error rate and the second error rate have different values.

30. The method according to claim 21 wherein the setting step includes a first frame-error rate as the first quality of service and a second frame-error rate as the second quality of service, wherein the frame-error rate and the second frame-error rate have different values.

31. A method for controlling power in a wireless communications system that supports multiple communication channels per subscriber, the method comprising the steps of:
   setting a first quality of service target for the first communications channel and a second quality of service target for the second communications channel;
   measuring a first quality of service parameter and a second quality of service parameter at a base station;
   transmitting control data over a single control channel to control uplink transmit power based upon a first difference between the first quality of service parameter and the first quality of service target and incremental offset data.

32. The method according to claim 31 wherein transmitting control data further comprises transmitting a first difference between the first quality of service and the first quality of service target.

33. The method according to claim 31 further comprising the step of deriving a second difference between the second quality of service parameter and the second quality of service target with reference to the incremental offset data.

34. The method according to claim 31 wherein the transmitting of control data includes sending the incremental offset data on an as-needed basis.

35. The method according to claim 31 further comprising the step of updating the control data by sending a latest incremental offset data between the mobile station and the base station to supersede said incremental offset data in said transmitting step.

36. The method according to claim 31 further comprising the step of updating the control data by sending a latest incremental offset data between the mobile station and the base station to supersede said transmitted incremental offset data in said transmitting step, if the latest incremental offset data differs from said previous incremental offset data by a threshold amount or greater.

37. The method according to claim 31 wherein the transmitting of control data includes sending incremental update data related to the first difference and the incremental offset data related to a second difference between the second quality of service parameter and the second quality of service target.

38. The method according to claim 31 further comprising the step of establishing a voice channel as the first communications channel and a data channel as the second communications channel for simultaneous or overlapping operation.

39. The method according to claim 31 wherein the setting step includes a first error rate as the first quality of service and a second error rate as the second quality of service, wherein the first error rate and the second bit error rate have different values.

40. The method according to claim 31 wherein the setting step includes a first frame-error rate as the first quality of service and a second frame-error rate as the second quality of service, wherein the frame-error rate and the second frame-error rate have different values.

* * * * *